US007672005B1

(12) United States Patent
Hobbs et al.

(10) Patent No.: US 7,672,005 B1
(45) Date of Patent: Mar. 2, 2010

(54) METHODS AND APPARATUS FOR SCAN BLOCK CACHING

(75) Inventors: David V. Hobbs, Surrey (CA); Bill Lin, San Diego, CA (US)

(73) Assignee: Teradici Corporation, Burnaby, British Columbia (CA)

( * ) Notice: Subject to any disclaimer, the term of this patent is extended or adjusted under 35 U.S.C. 154(b) by 1242 days.

(21) Appl. No.: 11/173,817

(22) Filed: Jun. 30, 2005

Related U.S. Application Data

(60) Provisional application No. 60/584,751, filed on Jun. 30, 2004.

(51) Int. Cl.
*G06F 15/00* (2006.01)
*G06F 12/02* (2006.01)

(52) U.S. Cl. .................................. 358/1.15; 345/543
(58) Field of Classification Search .............. 358/1.15, 358/1.14, 1.13, 1.16, 1.18, 427, 426.04, 462, 358/464; 345/543, 536, 201, 544, 531, 555; 709/247, 217, 229, 223, 230; 382/176, 177; 375/E7.264
See application file for complete search history.

(56) References Cited

U.S. PATENT DOCUMENTS

| | | | |
|---|---|---|---|
| 5,949,555 A | 9/1999 | Sakai et al. ............... | 358/462 |
| 5,990,852 A | 11/1999 | Szamrej ..................... | 345/2 |
| 6,633,670 B1 | 10/2003 | Matthews .................. | 382/176 |
| 6,664,969 B1 * | 12/2003 | Emerson et al. ........... | 345/544 |
| 2002/0054044 A1 | 5/2002 | Lu et al. | |
| 2004/0010622 A1 | 1/2004 | O'Neill et al. | |
| 2005/0036694 A1 * | 2/2005 | Li et al. ..................... | 382/232 |

OTHER PUBLICATIONS

Co-pending U.S. Appl. No. 11/173,303, filed Jun. 30, 2005 entitled Method and Apparatus for Generating Masks for a Multi-Layer Image Decompostion which is currently under examination.
Antochi, Iosif et al., "Selecting the Optimal Tile Size for Low-Power Tile-Based Rendering," *Proceedings of ProRISC 2002*, Veldhoven, The Netherlands, 6 pages, Nov. 28-29, 2002.
Bethel, Wes et al., "Consuming Network Bandwidth with Visapult," Section Eight: Large-scale Data Visualization, Chapter 5, in *The Visualization Handbook*, editors Hanson, C. and Johnson, C., Academic Press, pp. 569-592, Dec. 15, 2004 also published on the Internet circa Mar. 7, 2003.

(Continued)

*Primary Examiner*—Saeid Ebrahimi Dehkordy
(74) *Attorney, Agent, or Firm*—Lewis and Roca LLP

(57) ABSTRACT

A method and apparatus for comparing portions of data from a digital raster signal to a plurality of scan blocks of data, where each scan block in the plurality describes either a defined image area or entire image frame is disclosed. Included are a hashing function that calculates hash codes for spatially-defined segments of an incoming raster signal; a recent scan hash table containing hash codes for scan blocks received within a specified time period; a comparator for comparing calculated hash codes for the spatially-defined segments of the incoming raster signal with hash codes stored in the recent scan hash table; a pixel capture and timing module for capturing a digital raster signal; and an output selector for selecting for transmission a compressed form of a scan block, a hash code index, or no data if a scan block exists in a remote frame playout buffer.

23 Claims, 5 Drawing Sheets

OTHER PUBLICATIONS

Duca, Nathaniel et al., "Stream Caching: Optimizing Data Flow within Commodity Visualization Clusters," DIMACS Working Group, duca.acm.jhu.edu/papers/Caching-1.pdf, 4 pages, Mar. 2003.

Gormish, Michael et al, "Tile-Based Transport of JPEG 2000 Images," Tile-Based Transport of JPEG 2000 Images. Visual Content Processing and Representation, 8th International Workshop, *VLBV*, pp. 217-224, Madrid, Spain, Sep. 18-19, 2003.

Humphreys, Greg, et al., "WireGL: A Scalable Graphics System for Clusters," International Conference on Computer Graphics and Interactive Techniques, *Proceedings of the 28th Annual Conference on Computer Graphics and Interactive Techniques*, pp. 129-140, 2001.

ISO/IEC JTC 1/SC 29/WG 1 N3174, "Coding of Still Pictures," JPEG 2000 image coding system—Part 9: Interactivity tools, APIs and protocols—Final Committee Draft 2.0, 102 pages, Dec. 16, 2003.

ISO/IEC JTC 1/SC 29/WG 11 N2503-SEC5, ISO/IEC FDIS 14496-3 sec5 "Information technology—Coding of audio-visual objects" Part 3 Audio, Section 5; Structured audio, 143 pages, Mar. 10, 1999.

Nieh, Jason, et al., "A Comparison of Thin-Client Computing Architectures," Technical Report CUCS-022-00, www.nomachine.com/documentation/pdf/cucs-022-00.pdf, Network Computing Laboratory, Columbia University, Nov. 2000.

Ortiz, J.P. et al., "Remote Browsing of JPEG 2000 Images on the Web: Evaluation of Existing Techniques and a New Proposal," in Juan J. Villanueva, editor, *Proceedings of the Fourth IASTED International Conference on Visualization, Imaging, and Image Processing*, Marbella, Spain, Acta Press, pp. 854-859, Sep. 2004.

Richardson, Tristan, "The RFB Protocol," Tristan Richardson, RealVNC Ltd (formerly of Olivetti Research Ltd / AT&T Labs Cambridge), www.realvnc.com/docs/rfbproto.pdf, Version 3.8, 43 pages, Mar. 2005.

Schulzrinne, H., RFC2833 "RTP Payload for DTMF Digits, Telephony Tones and Telephony Signals," IETF Network Working Group, http://rfc.net/rfc2833.html, 30 pages, May 2000.

Taubman, David et al., "Architecture, Philosophy and Performance of JPIP: Internet Protocol Standard for JPEG2000," *VCIP*, pp. 791-805, 2003.

Taubman, David, "Remote Browsing of JPEG2000 Images," *ICIP* (1) 229-232, 2002.

Taubman, David, "The JPIK Protocol (JPeg2000 Interactive," Kakadu), www.kakadusoftware.com/jpik.pdf, 22 pages, Nov. 30, 2001.

* cited by examiner

METHODS AND APPARATUS FOR SCAN BLOCK CACHING

RELATED APPLICATION

This application claims priority to U.S. Provisional Application Ser. No. 60/584,751, entitled "Method and Apparatus for Screen Block Caching for Remote Graphical Display," filed Jun. 30, 2004, incorporated by reference herein in its entirety.

FIELD OF THE INVENTION

The invention relates generally to a method for communicating graphics signals across a transmission medium and more particularity to a method for transmitting a computer display signal to a remote user interface across a standard network.

BACKGROUND OF THE INVENTION

Historic advances in computer technology have made it economical for individual users to have their own computing system, which caused the proliferation of the Personal Computer (PC). Continued advances of this computer technology have made these personal computers very powerful but also complex and difficult to manage. For this and other reasons, there is a desire in many workplace environments to separate the user interface devices, including the display and keyboard, from the application processing parts, or data processor of the computing system. In this preferred configuration, the user interface devices are physically located at the user's desktop, while the processing and storage components of the computer are placed in a central location. The user interface devices are then connected to the data processor and storage components with some method of communication.

Several commercial techniques exist to support the transmission of these user interface signals over standard networks and some are compared in "A Comparison of Thin-Client Computing Architectures," Technical Report CUCS-022-00, Jason Nieh, S. Jae Yang and Naomi Novik, Network Computing Laboratory, Columbia University, November 2000.

While there are a variety of techniques used today to communicate video or graphics across a network of limited bandwidth, none utilize compression algorithms that take advantage of the recurring history patterns found within a computer display image.

One of the challenges associated with existing techniques lies in the development of methods capable of transmitting high bandwidth display signals from the processing components to the remote desktop across a standard network of relatively low bandwidth.

Some telecommunications technologies compress data streams based on recurring patterns; for example the compression of tones signals and other audio information. As one example, RFC2833 specifies a method for transmitting DTMF tones across a packet network using coded signatures rather than transmitting the tones themselves. Another example is the structured audio object language (SAOL) as found in MPEG-4, described in ISO/FDIS 14496-3, that is used to transmit complex audio across packet networks as a series of instructions. These methods support only a predefined range of input signals and generally expect the client side of the network to contain a static library of objects identified by the signature rather than dynamically detecting and using historic data patterns. Additionally, these methods are not applicable to video and digital graphics.

There are a few examples of methods for communicating computer display graphics information across a network. The simplest method is to periodically send copies of frame buffer information from a data processor. This is impractical for sending a normal SXGA display image of 1280×1024 at 24-bit color resolution across a standard 100 Base T LAN network as each 4 MB frame would take 0.3 seconds of dedicated network bandwidth, making perception-free communications of display information impossible.

An alternative approach is to intercept graphics instructions on the data processor and communicate these across the network to the remote user. This method is both restrictive in its compatibility and intrusive as it requires operating system dependent graphic command routing software running on the data processor. Furthermore, it requires a processor and software located at the remote user interface that is capable of interpreting the graphics commands. This adds cost and complexity to the remote installation.

Another approach is for the data processor to compare the previously transferred frame buffer information with the current frame and only transfer changes between them. This decreases the overall amount of data, especially for computer displays where much of the display is often static from frame to frame. This approach is expensive to implement as the data processor requires at least two frame buffers, a copy of the previously communicated frame buffer and the present frame. The previous frame buffer must be compared a pixel at a time with the present frame buffer and the difference communicated, either in real-time or from a temporary additional delta-buffer. This approach is memory- and computationally intensive, thus decreasing the performance of applications running on the data processor. This is especially noticeable in applications such as video that involve significant screen refresh activity where each screen refresh requires the movement and copying of graphics information between the frame buffers across the local system bus of the data processor.

An enhancement of this method reduces the overall data processor memory requirement by segmenting the frame buffer into spatially connected tiles and maintaining a list of signatures for the tiles. The new display frame is tiled and the signature for each new tile is compared with the signature in the list to determine if the tile should be transferred.

The concept of tiling images for remote display is popular and forms the basis for standard methods of remotely accessing images, including the JPIP protocol described in Part 9 of the JPEG2000 standard and the AT&T Laboratories RFB protocol. Variations on display tiling are described by Emerson et al. in U.S. Pat. No. 6,664,969 and Szamrej in U.S. Pat. No. 5,990,852. These tiling and list systems and methods are limited. They all require hardware or application-based frame buffers that are tightly-coupled with the data processor architecture. Any copying of display pixels or signatures loads the system bus of the data processor, lowering the performance of the system. Some of the methods interrupt the operating system for a background task to manage the activity, which severely reduces the performance of the data processor.

In summary, existing methods of transferring display information from a data processor to a remote user interface are limited by high cost and high maintenance requirements. The supported display update rates are low or the methods used adversely impact the performance of the data processor. These solutions only look for changes from one frame to the next. None of the systems described take advantage of the specific characteristics of a computer display, specifically the frequent transitions of parts of a display image to historic, previously-displayed states. None of these methods use a non-intrusive compression engine capable of perception-free, real-time compression of a digital raster signal.

SUMMARY OF THE INVENTION

The primary objective of the present invention is to provide a method and apparatus for efficiently transmitting a graphic display signal from a host data processing system to a remote display across a communications link. Another objective of the present invention is to provide a method and apparatus for reducing the required bandwidth and resulting latency of a remote display by maintaining a synchronized cache of scan blocks that have a high probability of re-use at the remote display. A further objective of the invention is to provide a non-intrusive system capable of acquiring the graphic display signal produced by a host computing system and to transfer the signal to a remote display as a data stream.

In one aspect, the present invention provides a system for comparing scan blocks from a digital raster signal to recently-used and historic scan blocks of the signal in real-time. The system includes a pixel capture and timing circuit for capturing a digital raster signal; a hashing function that computes hash codes for incoming scan blocks; recent scan and history scan hash tables; a comparator for comparing incoming scan block hash codes with codes in the hash tables; a history table update manager for determining if the hash code for a scan block should be moved to the history hash table; and an output selector for transmitting a compressed form of a scan block, a hash code index, or no data in the case where the scan block exists in the remote frame playout buffer.

In another aspect, the present invention provides a method for determining the probability of re-use of a scan block and synchronizing the image cache at a remote display based on that probability. The method includes testing for the history or persistence of an incoming scan block; storing a hash code associated with a persistent scan block in a history hash table; instructing the remote display to store the actual scan block in its local cache; and applying cache update and replacement policies to the history scan hash table to optimize the likelihood of positive history table hits.

In yet another aspect, the present invention compares the hash codes of incoming scan blocks with the codes of recently used and historic scan blocks to determine if the remote display has a copy of the scan block in its local cache or frame playout buffer.

In an embodiment, the present invention provides a method for compressing a real-time digitized raster signal. The method includes computing and storing hash codes for recently-used and historic scan blocks; determining whether the remote display has a copy of an incoming scan block based on whether the code for that block exists at the host; and based on that determination, compressing the real-time signal by either transmitting a compressed form of the scan block or an index representing the scan block to the remote display.

In summary, the present invention provides an apparatus that connects to the digitized raster output of a data processing system without adversely impacting the operational performance of the system as is the case with delta-buffer and signature list techniques. The present invention maintains host and remote records of historic scan block information which ensures the reduction of historic information transfer from the host to the remote display using lower bandwidth than existing display tiling and list techniques, which have no knowledge of previously displayed states. Additional features and advantages of the present invention will be apparent from reading the following detailed description, when considered in conjunction with the accompanying drawings.

DETAILED DESCRIPTION

Figure 1:
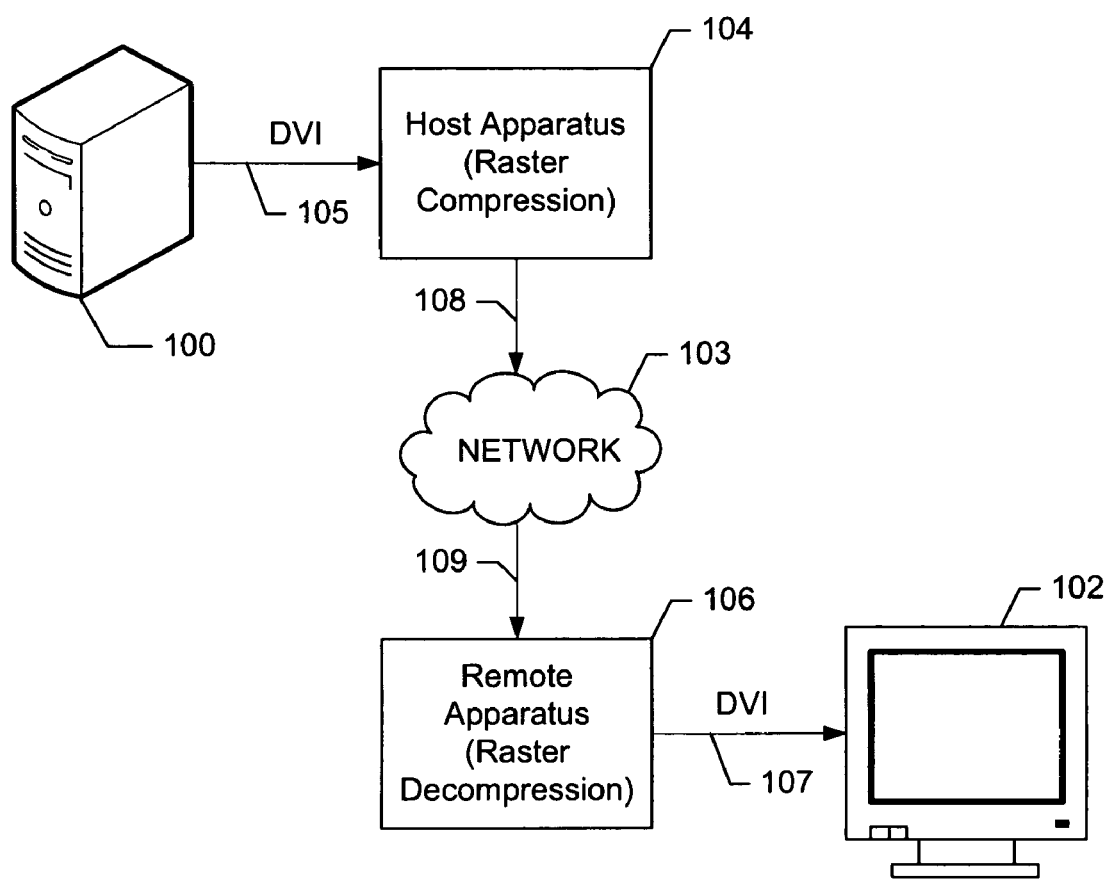
FIG. 1 provides a system view of a data processor connected to a remote display with the Host Apparatus and Remote Apparatus in the communications path, providing compression and decompression of a digitized raster signal.

FIG. 1 provides a system-level illustration showing the context of the invention. A data processing system 100 is connected to a remote display 102 via a transmission network 103. The invention itself is comprised of two components inserted in the communications path between data processing system 100 and remote display 102. The first component is raster compression apparatus 104 that connects to display output signal 105 of data processing system 100 and is located at the data processing side of network 103. This component is referred to herein as the "host apparatus." The second component is raster decompression apparatus 106 that connects to display input signal 107 of remote display 102 and is located at the remote display end of network 102. This component is referred to herein as the "remote apparatus."

In the preferred embodiment, display output signal 105 from data processing system 100 is a Digital Visual Interface (DVI) digitized raster signal. In alternative embodiments, other graphics signals such as High Definition Multimedia Interface (HDMI) can be accommodated. Given that the preferred embodiment of the present invention intercepts the output raster stream rather accessing display information from a frame buffer, the present invention is computationally independent from the system that generates the display image. The present invention neither loads the local system bus of data processing system 100 nor does it require processing software located on data processing system 100, thus being non-intrusive on data processing system 100.

Host Apparatus Description

Figure 2:
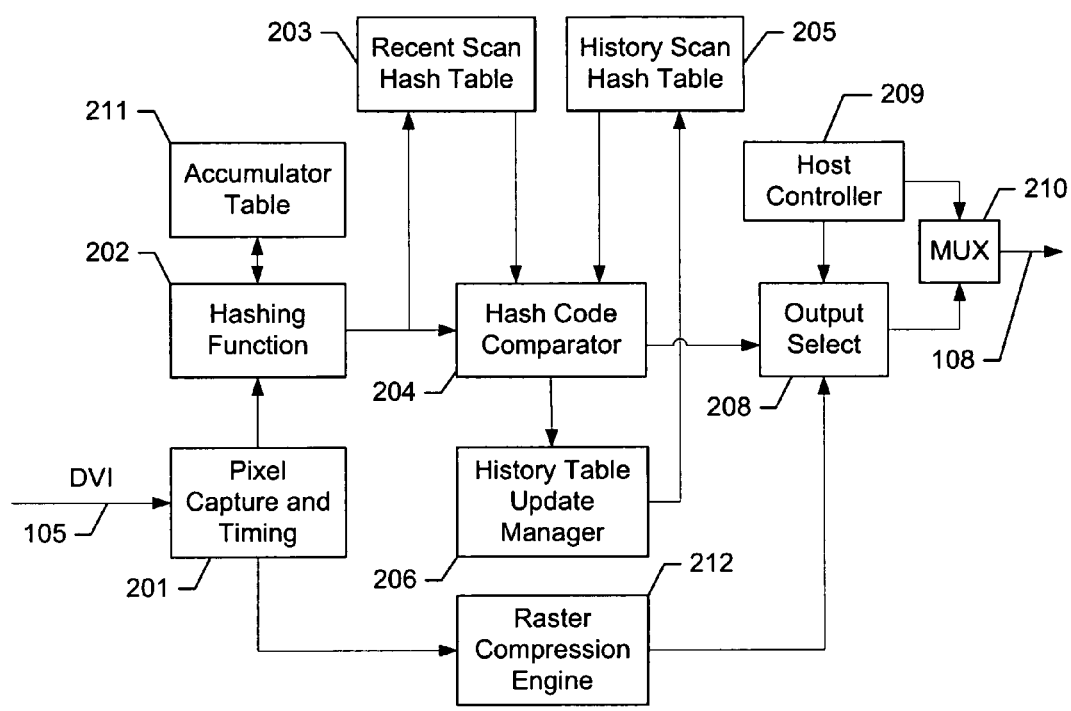
FIG. 2 is a detailed view of the Host Apparatus that compresses the digitized raster signal.

FIG. 2 provides an illustration of raster compression apparatus 104. Incoming DVI signal 105 from data processing system 100 is intercepted by pixel capture and timing circuit 201 which forwards the pixel values to hashing function 202 and raster compression engine 212. Pixel capture and timing circuit 201 supplies timing information for the incoming data stream to raster decompression apparatus 106, either as data embedded in the compressed display stream or as control messages.

Hashing function 202 operates in conjunction with accumulator table 211 to calculate hash codes for spatially defined segments of the incoming raster signal. Once calculated, the hash codes are stored in recent scan hash table 203. The preferred embodiment operates on square blocks of 16×16 pixels. In alternative embodiments, hashing function 202 and accumulator table 211 capture and segment partial lines, single lines, other defined image areas or entire image frames. These object types are referred to herein as "scan blocks." The preferred embodiment stores scan block hash codes sequentially in recent scan hash table 203. This linear addressing structure has a direct 1:1 mapping to the display stream such that no separate co-ordinate information needs to be stored. Recent scan hash table 203 also stores history information for each hash code which is used to test the eligibility of the hash code for storage in history scan hash table 205.

Raster compression apparatus 104 uses hash code comparator circuit 204 to compare the hash code of the current scan block with other hash codes stored in recent scan hash table 203 and history scan hash table 205. The preferred embodiment stores history scan hash codes sequentially in the table. This linear addressing structure has a direct n:1 mapping to the display stream which means that no separate co-ordinate information needs to be stored. History scan hash table 205 holds a set of n historic hash codes for each scan block location in addition to a set of m cache management parameters for each hash code.

The apparatus also includes history table update manager 206 which identifies any persistent scan blocks that appear in identical spatial locations in multiple consecutive frames by evaluating the history information associated with the hash code. Once a persistent scan block is identified, its hash code is added to the history scan hash table and an abbreviated index for the hash code is either generated (in the case that the hash code is not already in the table) or updated (in the case where the hash code already exists in the table). History table update manager 206 is also responsible for fast loading of history scan hash table after initialization and the management of more sophisticated cache management policies should they be implemented.

Pixel capture and timing circuit 201 also forwards pixels to raster compression engine 212 which may use a variety of lossless or lossy compression techniques depending on the nature of the image or the desired image quality. Under the direction of host controller 209, output selector 208 selects either an abbreviated index that identifies a recent or history hash code or it selects a compressed scan block. As an example, the preferred embodiment uses a three-bit index to allow the identification of eight unique scan blocks for each spatial location. Finally, multiplexer 210 combines the compressed display with control information from host controller 209 for transmission across network 102. The control information includes synchronization messages to remote controller 402 identifying any additions or deletions of table entries. The remote apparatus uses these messages to decide which scan blocks should be added or deleted from its own cache, ensuring that the remote cache and frame buffer is accurately synchronized with the hash tables of the host apparatus.

Figure 3:
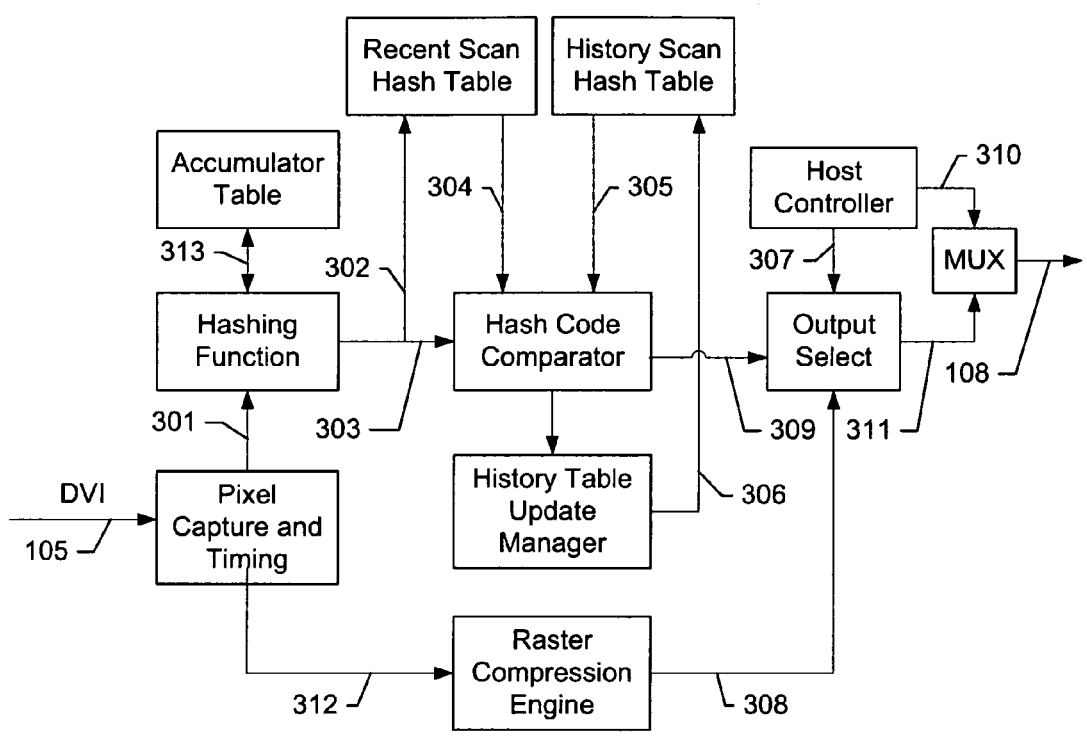
FIG. 3 is a detailed view of the internal communications structures in the Host Apparatus.

FIG. 3 provides a different view of the host apparatus showing the communication paths between the components within the apparatus to provide a description of the data flow and communication parameters. Incoming DVI signal 105 is intercepted and pixel values are forwarded to hashing function 202 across channel 301. Hash codes are calculated using accumulator table 211 for storage 313 of partial hash codes. Fully computed hash codes are stored 302 in recent scan hash table 203. Hash code comparator 204 compares the code for incoming scan block 303 with codes from either recent scan hash table 203 (reference numeral 304) or history scan hash table 203 (reference numeral 305). If the hash code for an incoming scan block meets the defined history table eligibility criteria, it is stored (reference numeral 306) in history scan hash table 205 with an abbreviated hash code index that identifies the timing history of the hash code. In the preferred embodiment, a counter is used to test the persistence of each scan block and the scan block hash code and an index are stored in history scan hash table 205 if the counter reaches a defined threshold.

Incoming pixels are also forwarded as uncompressed pixel stream 312 to raster compression engine 212. In the preferred embodiment of the invention, host controller 209 instructs 307 output selector 208 to inject either compressed pixel stream 308 or abbreviated hash code index and timing information 309 into compressed output data stream 311 based on the outcome of the hash code comparison operation. This compressed data stream is assembled with control messages 310 from host controller 209 to form completed compressed raster signal 108. In an alternative embodiment, output selector 208 is instructed not to transmit display data unless hash code comparator 204 is unable to find a match in recent scan hash table 203. When hash code comparator 204 detects that a scan block at a location has changed, output selector 208 transmits the scan and associated timing provided by pixel capture and timing circuit 201 in the case of a new scan block or the hash code index in the case when the hash code is found in the history scan hash table. When a new scan block or history index has been transmitted and hash code comparator 204 subsequently detects the hash code for a subsequent block in the scan sequence of recent scan hash table 203, this signals that the subsequent block does not require retransmission. In cases where k sequential unchanged blocks are encountered, a run-length encoded message is transmitted to instruct the remote apparatus to retrieve the next k scan blocks from its own frame playout memory.

Remote Apparatus Description

Figure 4:
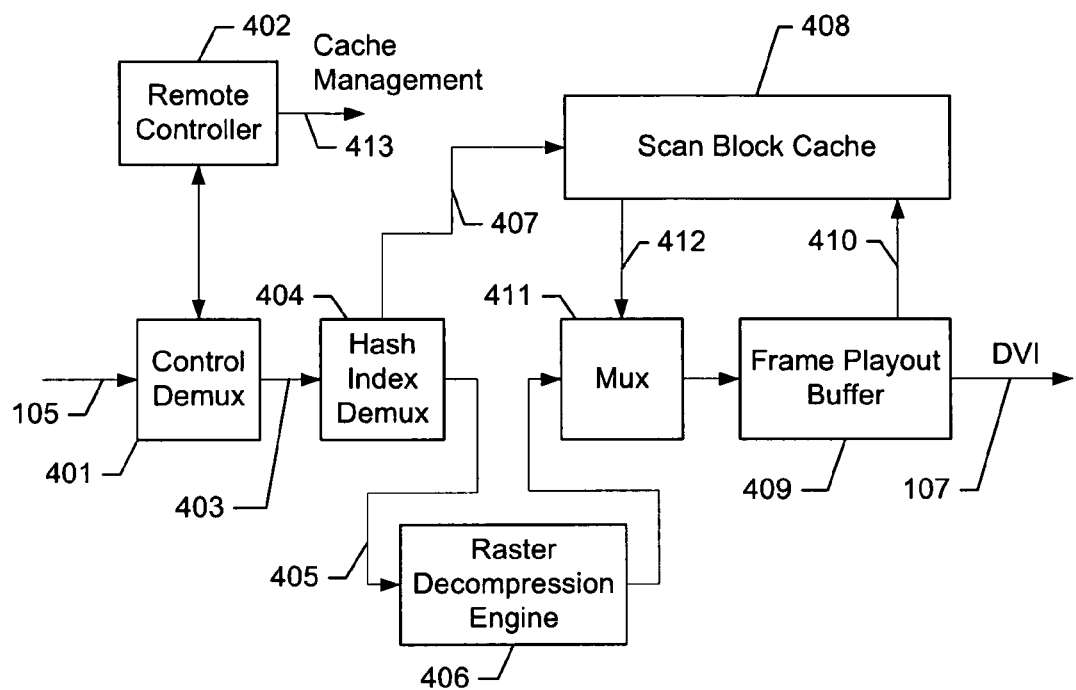
FIG. 4 is a detailed view of the Remote Apparatus that decompresses the signal delivered by the Host Apparatus, converting it back into a digitized raster signal.

FIG. 4 provides an illustration of raster decompression apparatus 106. Compressed stream 109 is stripped of control information by control de-multiplexer 401, which in turn forwards control messages to remote controller 402. Compressed DVI signal 403, comprising a stream of hash code indices and compressed scan blocks, is forwarded to hash index de-multiplexer 404. Compressed scan blocks 405 are passed to raster decompression engine 406 for decompression. History scan hash code indices are looked up (reference numeral 407) in scan block cache 408. Historic scan blocks are retrieved from scan block cache 408 (at reference numeral 412) and multiplexed into the media stream for insertion into frame playout buffer 409. Indices that identify hash codes in recent scan hash table 203 do not need to be looked up as frame playout buffer 409 holds all the scan blocks referenced in recent scan hash table 203.

Multiplexer 411 then stores a decompressed display stream from either raster decompression engine 406 or scan block cache 408 in frame playout buffer 409.

Frame playout buffer 409 then generates timed DVI display signal 107 for remote display 102, which has a similar or identical format to DVI signal 105 transmitted by data processing system 100. In this embodiment, latency associated with retrieving scan blocks is low as the retrieved blocks are stored in an uncompressed state due to prior processing in raster decompression engine 406.

When the host apparatus copies a hash code to history scan hash table 205, remote controller 402 sends an instruction 413 to frame playout buffer 409 to store associated scan block 410 in scan block cache 408. Additionally, when hash codes are deleted from history scan hash table 205 on the host, remote controller 402 sends instructions 413 for these blocks to be deleted from scan block cache 408. This ensures that scan block cache 408 is synchronized with history scan hash table 205.

In a lossy compression embodiment, the host apparatus may transmit an index identifying a scan block in recent scan hash table 203 that is similar but not necessarily identical to the incoming scan block at the host apparatus. The block that is similar to the block in raster compression engine 212 is inserted into frame playout buffer 409, resulting in a DVI stream that is similar but not identical to the original stream.

In an alternative embodiment, raster decompression engine 406 is located downstream from multiplexer 411, enabling the scan blocks to be stored in compressed format. This embodiment has the advantage of a smaller cache memory but destroys the linear structure of the display stream in scan block cache 408 and mandates random access to compressed objects in scan block cache 408. In this alternative embodiment, incoming compressed scan blocks are stored in scan block cache 408 immediately after the hash index has been stripped as an alternative to copying scan blocks (reference numeral 410) from frame playout buffer 409 to scan block cache 408.

In the embodiment that transmits no data stream in the case where an incoming signal is a repetition of the previous scan, compressed stream 109 is comprised of a series of historic hash indices, compressed scan blocks and embedded run-length codes that identify the positions of previously transmitted blocks. Given that frame playout buffer 409 is synchronized with recent scan hash table 203, the blocks identified by the run length codes are already available in frame playout buffer 409.

Scan Compression Method

Figure 5:
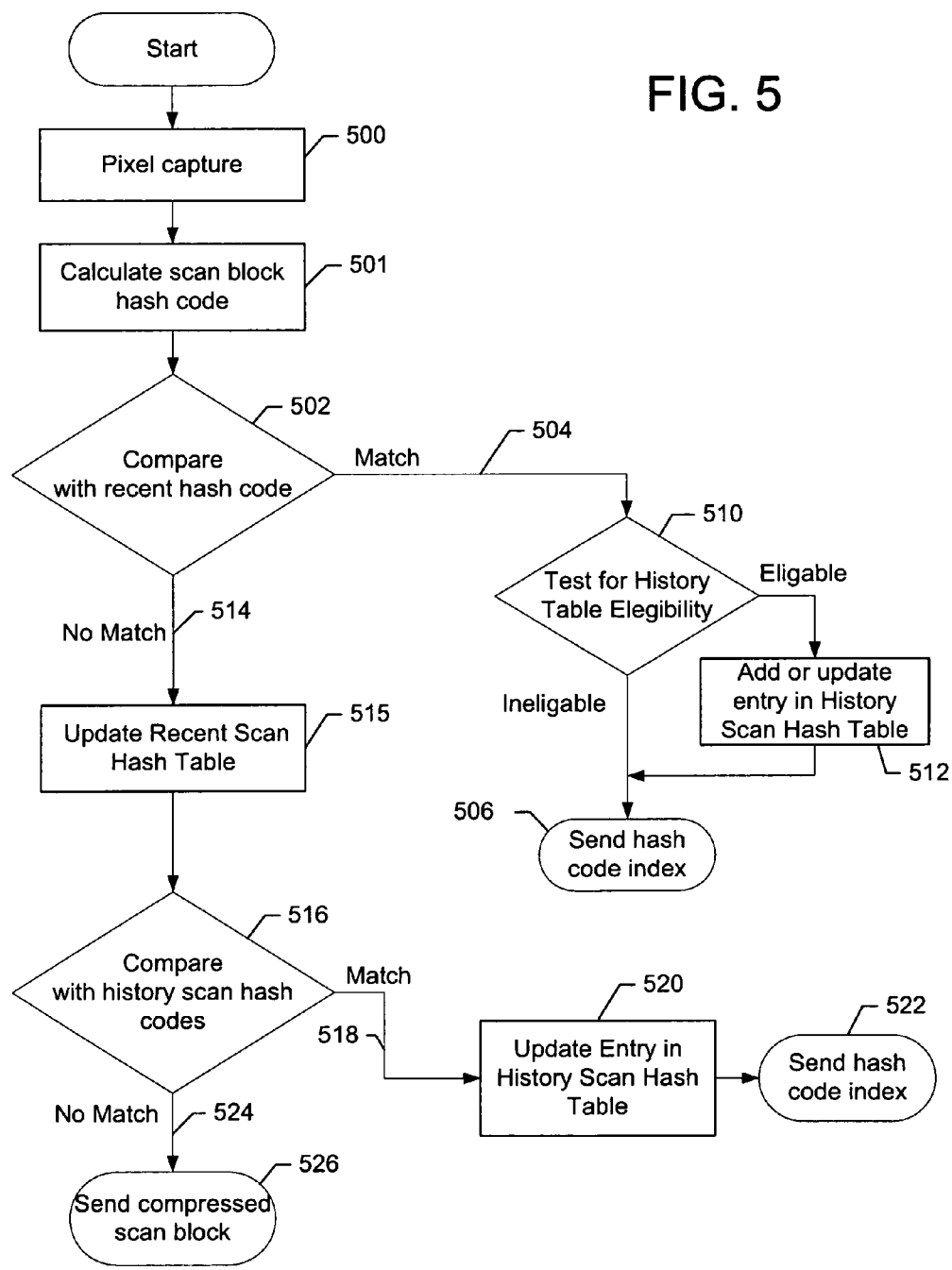
FIG. 5 is a flowchart showing the method used by the Host Apparatus to compress the digitized raster signal.

FIG. 5 illustrates the method used by the host apparatus shown in FIG. 2 to process and compress incoming DVI signal 105. At act 500, the DVI signal is intercepted by pixel capture and timing circuit 201. Hash codes for spatially defined scan blocks of the incoming raster signal are calculated at act 501. In the preferred embodiment, hash codes are calculated for scan blocks of 16×16 pixels. Hashing function 202 calculates a partial hash code for a horizontal raster line sequence of 16 incoming pixels from pixel capture and timing circuit 201. Starting with the first line in a horizontal scan, a partial hash code for the first 16 pixels in the line is calculated recursively (i.e. the hashing function is executed and a new partial value generated as each pixel is intercepted).

Once the partial code has been calculated, it is stored in accumulator table 211 and hashing function 202 calculates and stores a new partial code for the next 16 pixels in the line. This sequence of calculating partial hash codes is repeated until the end of the line of pixels in the scan. When the second scan line is initiated, the partial hash code for the first 16 pixels of the first line is retrieved from accumulator table 211 and the code is updated to include the first 16 pixels in the new line directly below the first line. This sequence is repeated for the rest of the second line and for all 16 lines until accumulator table 211 has a series of hash codes representing adjacent blocks of 16×16 pixels, at which time the hash codes are moved to recent scan hash table 203. Hash codes are then calculated for the second row of blocks in the image and the sequence is repeated following the raster scan down and across the image until the complete image is converted into a series of codes.

Given that the preferred embodiment operates on adjacent display blocks, the blocks are processed by hash code comparator 211 in sequence once sufficient lines have been captured to specify a series of adjacent blocks. In alternative embodiments, hash codes may be calculated for other defined scan regions, including partial scan lines, complete scan lines or multiple consecutive scan lines.

In the preferred embodiment, hashing function 202 utilizes a Cyclic Redundancy Check (CRC) algorithm that calculates a strong checksum as the hash code. However, the MD5 algorithm, Secure Hash (SHA-1) algorithm or other hashing, fingerprinting or message digest functions are also utilized in alternative embodiments. These strong checksum algorithms compute a k-bit code that is sufficiently unique in the sense that the probability of computing the same code from two different scan blocks is relatively small. At decision act 502, the hash code for the scan block is compared with the codes of recent scan blocks in recent scan hash table 203.

In the preferred embodiment, the hash code is only compared with the code for the equivalently positioned scan block from the previous frame of the image in order to minimize the computational instruction effort and maintain real-time performance using an economical circuit. In an alternative embodiment it is also feasible to search other areas of recent scan hash table 203 for a match.

In cases where the scan block hash code matches (act 504) a code stored in the recent scan hash table 203, this indicates that the same block has recently been transmitted to the remote apparatus and is available in frame playout buffer 409. Before the hash code index is transmitted at act 506, a determination is first made (decision act 510) whether the hash code is eligible for entry to history scan hash table 205. In the preferred embodiment, a simple counter value is used to determine the persistence of any scan block. This counter value is stored with each hash code entry in recent scan hash table 203. If there is a match (act 504) between the code and a code in recent scan hash table 203, the persistence block counter value for the scan block is incremented. If the counter value reaches a threshold, there is a reasonable probability that the scan block may re-appear at a later time (e.g. the background picture of a display re-appearing after a pop-up box is closed), and therefore the entry in history scan hash table 205 is updated at act 512. If the hash code is already in history scan hash table 205, the entry is updated with the new persistence information. If the hash code does not already exist in history scan hash table 205, it is added to history scan hash table 205 and a message is sent to the remote apparatus to add the block and hash code index to remote scan block cache 408. A cache policy is employed be the host apparatus to manage the data currency of history scan hash table 205.

While the preferred embodiment associates a single persistence threshold value with all scan blocks, some applications may benefit from the ability to associate different thresholds with different areas of a computer monitor to prevent blocks that are unlikely from re-appearing from being stored in scan block cache 408. For example, it's inefficient to store the scan block for the clock image displayed in the bottom right hand corner of a Windows-based screen given that the same data reappears very infrequently).

If the current scan block hash code does not match the recent scan block hash code (act 514), recent scan hash table 203 is updated at act 515. The existing table entry is replaced with the hash code for the incoming scan block and the persistence history is reset for the new block.

At decision act 516, the hash code of the incoming scan block is compared with existing codes in history scan hash table 205. In the preferred embodiment, the code is compared with an historic code set associated with the equivalent scan block in the same scan position from a series of historic frames of the image. This minimizes the computational instruction effort using an economical search circuit. In alternative embodiments, other areas of historic frames or even the entire history hash table are searched for a match.

In cases where the current hash code matches an historic value (act 518), the entry in history scan hash table 205 is updated (act 520) to reflect that the scan block is once again active and a hash code index is transmitted at act 522. In cases where there is no match with historic hash codes (act 524), it is safe to assume that the incoming scan block is not available in remote scan block cache 408 or frame playout buffer 409 and the compressed scan block is transmitted at act 526.

Host Tables Data Structure—Recent Scan Hash Table

In the preferred embodiment, recent scan hash table 203 contains a single hash code entry and a persistence counter value for every scan block position within an image frame. If the incoming hash code matches a recent hash code, an index indicating that the frame is stored in recent scan hash table 203 is transmitted (e.g. an index value of 0 is used to identify the hash code is in recent scan hash table 203 whereas a value of 1-n identifies n different historic hash codes for each spatial location in history scan hash table 205).

Host Tables Data Structure—History Scan Hash Table

History scan hash table 205 contains an associative data set for every scan block position within an image frame. Each table entry corresponding to a scan block position contains n historic hash codes and a set of m variables for each hash code used to manage the data policy. Examples of useful variables supported by embodiments of the present invention include a timestamp indicating when the entry is created, a timestamp indicating the time that the scan block is no longer present and a counter value depicting the number of times the hash code has been accessed. These variables are used in the enforcement of a cache policy.

History Scan Hash Table Cache Policies

In the preferred embodiment, a cache management policy is employed to ensure that the table is always populated by data that has the highest probability of reuse. The policy is applied by history table update manager 206 when matching hash codes are tested for history scan table eligibility (decision act 510). In alternative embodiments, the update of timestamps may be triggered by initialization and periodic events while cache replacement actions may be triggered by memory restrictions or for other reasons.

The preferred embodiment deploys a least-recently-used (LRU) cache replacement policy. In this policy, a time-stamp identifying when a particular scan block was last accessed is maintained. The timestamp for the corresponding history scan hash code is updated whenever a new hash code entry is created (act 512) and the timestamp is updated when the hash code meets the eligibility criteria (decision act 510) or when an incoming scan block code is found to match a code already in history scan hash table 205, and history scan hash table is updated at act 520.

If history scan hash table 205 is full, the LRU policy is used to choose the entry with the oldest timestamp for replacement. An alternative embodiment uses the least-often referenced (LOR) replacement policy. In this policy, a reference count of how often a particular scan block has been accessed since the corresponding entry was last created is maintained. When the hash code is accessed, the reference count is incremented if a matching entry is found or reset if a new entry is created. The LOR policy can be used to choose an entry for replacement by identifying the entry that has been least referenced. Other cache replacement policies, including those based on a combination of LRU and LOR, may also be used in embodiments of the present invention.

In the preferred embodiment, the spatial distribution of cached scan blocks is statically maintained at a depth of n historic blocks for each scan area of the image, with n being determined by the memory capacity of the remote cache. In alternative embodiments, the spatial distribution of historic scan blocks may be dynamically configured, depending on statistical or other properties of the scan. For example, in the case of a motion video displayed across only a portion of a computer monitor, there is little benefit to be gained by caching that area of the display and greater value to be gained by reallocating the cache to other areas of the display.

In cases where the channel bandwidth between the host apparatus and the remote apparatus is temporarily limited, for example as a result of network congestion, raster compression engine 212 may decide to intermittently drop frames as a mechanism for ensuring limited display functionality. If such a mechanism is deployed, it is important that the replacement policy ensure that the remote cache remains synchronized with hash tables 203,205 by tracking which frames are dropped. It is also important that the host apparatus is informed of frames or scan blocks dropped by transmission network 103. This may be accomplished using a reliable network protocol or an acknowledgement mechanism to validate that frames are correctly received. If a communication error occurs, it is critical that the lost signal be retransmitted to maintain cache synchronization.

Remote Cache Management Methods

In this embodiment, remote scan block cache 408 in the remote apparatus is synchronized with the host apparatus using a control messaging structure. Whenever entries from either recent scan hash table 203 or history scan hash table 205 are added or deleted, a synchronization message including the hash code index and the desired action is sent to remote controller 402. Remote controller 402 updates remote scan block cache 408 accordingly. Furthermore, the synchronization messages are delivered using a reliable transport protocol for example TCP/IP to ensure message delivery. For added reliability, additional acknowledgement or status verification protocols may be deployed.

Alternative Data Structure and Cache Management

In an alternative embodiment, remote scan block cache 408 in the remote apparatus maintains an identical recent scan hash table and history scan hash table to those in the host apparatus. In this embodiment, the remote apparatus independently maintains and synchronizes its own hash tables, reducing the control traffic between the host apparatus and the remote apparatus but at the expense of a greater management burden on the remote apparatus.

Alternative with Selective Compression

In the preferred embodiment of the invention, the pixel stream is compressed prior to transmission using raster compression engine 212. Depending on the graphic content of the display, different compression techniques may be used, such as Run-Length Encoding (RLE), Lempel Ziv Walsh (LZW) encoding, Joint Photographic Experts Group (JPEG) compression, and Motion Picture Experts Group (MPEG) compression. Depending on the compression method used, the display stream may be compressed on a per-scan block basis, across multiple scan blocks (e.g. LZW, JPEG), or across frame updates (e.g. MPEG). Once the compression block has been derived, the compressed scan block, timing information and a hash code index (if appropriate) are transmitted to the Remote Apparatus.

In an alternative embodiment, no compression is performed and raster compression engine 212 passes an uncompressed DVI signal through to output selector 208. In this embodiment, raster decompression engine 406 at the remote apparatus feeds the uncompressed display stream to frame playout buffer 409 without intervention.

Alternative with Direct Frame Buffer Access

In an alternative embodiment, the host apparatus incorporates a frame buffer structure and connects to the internal system bus of a data processing system rather than an output digitized raster scan and generates a compressed digitized raster signal as described here. In this embodiment, hash codes and indices are calculated for different regions of the frame buffer resulting in codes associated with pixel blocks as before. In this embodiment, recent scan hash table 203, history scan hash table 205, frame playout buffer 409 and scan block cache 408 are managed using the same methods as described above.

While methods and apparatus for scan block caching have been explained and illustrated ion detail, it is to be understood that many modifications can be made to the various embodiments of the present invention without departing from the spirit thereof.

What is claimed is:

1. A system for comparing portions of data from a digital raster signal to a plurality of scan blocks of data, each scan block in the plurality describing one of a defined image area and entire image frame, the system comprising:
   - a hashing function that calculates hash codes for spatially-defined segments of an incoming raster signal;
   - a recent scan hash table containing hash codes for scan blocks received within a specified time period;
   - a comparator for comparing calculated hash codes for the spatially-defined segments of the incoming raster signal with hash codes stored in the recent scan hash table;
   - a pixel capture and timing module for capturing a digital raster signal and forwarding pixel values to a compression engine; and
   - an output selector for selecting for transmission one of the group consisting of: a compressed form of a scan block, a hash code index, and no data if a scan block exists in a remote frame playout buffer;
   - wherein the compression engine and the hashing function use a data stream portioning, the data stream portioning defining the spatially-defined segments of an incoming raster signal, the spatially-defined segments determining compression of scan blocks associated with the incoming raster signal.

2. The system of claim 1, wherein the recent scan hash table stores hash codes in sequential order with respect to a sequence in which incoming scan blocks are received by the system.

3. The system of claim 1, further comprising a host controller, the host controller directing the output selector to select one of the group consisting of an abbreviated index identifying a hash code and a compressed scan block.

4. The system of claim 1, further comprising a multiplexer, the multiplexer combining compressed image display information with control information for transmission across a communications network.

5. The system of claim 1, wherein the compression engine uses a lossy compression technique.

6. The system of claim 1, wherein the compression engine uses a lossless compression technique.

7. The system of claim 1, further comprising an history scan hash table containing hash codes for received scan blocks that appear a threshold number of instances in an identical spatial location within a frame of data.

8. The system of claim 7, wherein the comparator compares computed hash codes for incoming scan blocks with hash codes stored in the history scan hash table.

9. The system of claim 7, further comprising a history table update manager for moving a hash code computed by the hashing function on an incoming scan block into the history scan hash table.

10. The system of claim 9, wherein the history table update manager loads the history scan hash table with the hash code after the incoming scan block has been received a threshold number of instances.

11. The system of claim 9, wherein the history table update manager manages a cache implementation policy.

12. The system of claim 11, further comprising a multiplexer, the multiplexer combining compressed image display information with control information for transmission across a communications network.

13. The system of claim 12, wherein the control information includes synchronization messages for a controller on a remote system connected to the communications network, the synchronization messages identifying changes to entries in the recent scan hash table and history scan hash table, the changes identifying selections from the group consisting of scan blocks to be added to a remote system memory cache and scan blocks to be removed from the remote system memory cache.

14. A method for communicating scan blocks of data, wherein a scan block comprises data describing one of a defined image area and entire image frame, the method comprising:
   - receiving a digital raster signal containing pixel values, the receiving comprising using a data stream portioning to spatially define segments of the digital raster signal, the spatially-defined segments determining compression of the scan blocks, the receiving further comprising forwarding the scan blocks to a hashing function and a compression engine;
   - calculating a hash code from pixel values contained within the received digital raster signal;
   - comparing the calculated hash code with a hash code stored in a recent scan hash table, the recent scan hash table containing hash codes for recently-received scan blocks; and
   - transmitting one of the group consisting of: a compressed scan block, a hash code index, and a communication devoid of data if a scan block exists in a remote frame playout buffer.

15. The method of claim 14, wherein a counter is used to determine whether the calculated hash code satisfies the defined eligibility criteria, the counter used in a compare operation to determine a persistence of an incoming scan block contained in the digital raster signal.

16. The method of claim 14, wherein the hash code index is associated with
   a hash code contained in a history scan hash table.

17. The method of claim 16, wherein the hash code index is compressed before transmitting.

18. The method of claim 14, further comprising compressing a plurality of pixel values contained in the scan block using the compression engine.

19. The method of claim 18, wherein, based on a result of the comparing, the compressed plurality of pixel values is assembled with control messages to form a compressed raster signal that is transmitted to a remote computing device.

20. The method of claim 18, wherein, based on the result of the comparing, the abbreviated hash code index and timing information is assembled with control messages to form a compressed raster signal that is transmitted to a remote computing device.

21. The method of claim 20, further comprising instructing a host device not to transmit to the remote computing device a scan block that follows the changed scan block in a received stream of scan blocks.

22. The method of claim 14, further comprising:
   - determining that a scan block at a location has changed; and
   - transmitting the changed scan block and associated timing information to a remote computing device.

23. A computer readable storage medium containing instructions, which, when executed by a computer, compare portions of a digital raster signal to received scan blocks, wherein a scan block comprises data describing one of a defined image area and entire image frame, the method comprising:
  receiving a digital raster signal containing pixel values;
  calculating a hash code from pixel values contained within the received scan block;
  comparing the calculated hash code with a hash code stored in one of the group consisting of a recent scan hash table containing hash codes for recently-received scan blocks and an history scan hash table containing hash codes for received scan blocks that appear a threshold number of instances in an identical spatial location within a frame of data; and
  storing the calculated hash code in the history scan hash table if the calculated hash code satisfies a defined eligibility criteria.

* * * * *